(12) United States Patent
Kim et al.

(10) Patent No.: US 9,940,718 B2
(45) Date of Patent: Apr. 10, 2018

(54) APPARATUS AND METHOD FOR EXTRACTING PEAK IMAGE FROM CONTINUOUSLY PHOTOGRAPHED IMAGES

(71) Applicant: Samsung Electronics Co., Ltd., Suwon-si (KR)

(72) Inventors: Hyun-Jun Kim, Osan-si (KR); Young-Sang Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 14/940,545

(22) Filed: Nov. 13, 2015

(65) Prior Publication Data
US 2016/0071273 A1 Mar. 10, 2016

Related U.S. Application Data

(63) Continuation of application No. PCT/KR2014/004272, filed on May 13, 2014.

(30) Foreign Application Priority Data

May 14, 2013 (KR) ........................ 10-2013-0054588

(51) Int. Cl.
*G06T 7/00* (2017.01)
*G06T 1/00* (2006.01)
(Continued)

(52) U.S. Cl.
CPC ........ *G06T 7/0022* (2013.01); *G06K 9/00751* (2013.01); *G06K 9/00758* (2013.01);
(Continued)

(58) Field of Classification Search
CPC ........... G06T 7/0022; G06T 7/74; G06T 7/97; G06K 9/00751; G06K 9/00758; G06K 9/00771; G06K 9/4871
See application file for complete search history.

(56) References Cited

U.S. PATENT DOCUMENTS 8,208,732 B2 6/2012 Nakamura
8,625,000 B2 * 1/2014 Shibagami ........... H04N 1/2112
348/231.2
(Continued)

FOREIGN PATENT DOCUMENTS

CN 101232581 A 7/2008
CN 101419666 A 4/2009
(Continued)

OTHER PUBLICATIONS

Cohen, Ira, et al. "Facial expression recognition from video sequences: temporal and static modeling." Computer Vision and Image Understanding 91.1 (2003): 160-187. (28 pages in English).
(Continued)

*Primary Examiner* — Kim Vu
*Assistant Examiner* — Molly Delaney
(74) *Attorney, Agent, or Firm* — NSIP Law

(57) ABSTRACT

An apparatus for extracting a peak image includes an image selector configured to select one of continuously photographed images; a base image determiner configured to determine at least one base image according to a predetermined criterion; a difference calculator configured to calculate a difference between the selected image and the at least one base image; and a peak image determiner configured to determine a peak image among the continuously photographed images based on the calculated difference.

25 Claims, 3 Drawing Sheets

(51) Int. Cl.
*G06K 9/46* (2006.01)
*G06T 7/73* (2017.01)
*G06K 9/00* (2006.01)

(52) U.S. Cl.
CPC ....... *G06K 9/00771* (2013.01); *G06K 9/4671* (2013.01); *G06T 1/0021* (2013.01); *G06T 7/74* (2017.01); *G06T 7/97* (2017.01); *G06T 2207/10004* (2013.01); *G06T 2207/30196* (2013.01)

(56) References Cited

U.S. PATENT DOCUMENTS

| | | | | |
|---|---|---|---|---|
| 9,392,163 | B2* | 7/2016 | Wu | H04N 5/23219 |
| 2008/0151075 | A1 | 6/2008 | Park | |
| 2009/0087099 | A1* | 4/2009 | Nakamura | G06K 9/00281 382/190 |
| 2010/0066840 | A1 | 3/2010 | Asukai et al. | |
| 2010/0272365 | A1* | 10/2010 | Yamamoto | G06K 9/00221 382/190 |
| 2012/0189208 | A1 | 7/2012 | Inaba et al. | |

FOREIGN PATENT DOCUMENTS

| | | |
|---|---|---|
| JP | 2007-81682 A | 3/2007 |
| JP | 2009-278287 A | 11/2009 |
| JP | 2010-68190 A | 3/2010 |
| JP | 2013-3706 A | 1/2013 |
| KR | 10-0692526 B1 | 3/2007 |
| KR | 10-2010-0060181 A | 6/2010 |
| KR | 10-0988323 B1 | 10/2010 |
| KR | 10-2011-0037485 A | 4/2011 |
| KR | 10-2012-0012208 A | 2/2012 |
| KR | 10-2012-0084517 A | 7/2012 |
| KR | 10-2012-0095193 A | 8/2012 |
| WO | WO 2011/033619 A1 | 3/2011 |

OTHER PUBLICATIONS

Pantic, Maja, et al., "Dynamics of Facial Expression: Recognition of Facial Actions and Their Temporal Segments From Face Profile Image Sequences." IEEE Transactions on Systems, Man, and Cybernetics, Part B: Cybernetics, vol. 36, No. 2, Apr. 2006: 433-449. (17 pages in English).

Zhao, Ming, et al. "Large Scale Learning and Recognition of Faces in Web Videos." Automatic Face & Gesture Recognition, 2008. FG'08. 8th IEEE International Conference on. IEEE, 2008. (7 pages in English).

Extended European Search Report dated Jan. 24, 2017 in counterpart European Application No. 14797460.4 (13 pages in English).

International Search Report dated Aug. 25, 2014, in counterpart International Application No. PCT/KR2014/004272 (5 pages, in Korean, including complete English translation of substantive portion).

Written Opinon dated Aug. 25, 2014 in counterpart International Application No. PCT/KR2014/004272 (13 pages, with English translation).

Chinese Office Action dated May 27, 2017 in counterpart Chinese Application No. 201480026824.4 (18 pages With English translation).

* cited by examiner

APPARATUS AND METHOD FOR EXTRACTING PEAK IMAGE FROM CONTINUOUSLY PHOTOGRAPHED IMAGES

CROSS-REFERENCE TO RELATED APPLICATION(S)

This application is a continuation of International Application No. PCT/KR2014/004272 filed on May 13, 2014, which claims the benefit of Korean Patent Application No. 10-2013-0054588 filed on May 14, 2013, in the Korean Intellectual Property Office, the entire disclosures of which are incorporated herein by reference for all purposes.

BACKGROUND

1. Field

This application relates to an apparatus and a method for extracting a peak image from continuously photographed images.

2. Description of Related Art

When a recognition process is performed using continuously photographed images, various images other than an image to be recognized may be included. In order to improve recognition performance, a change in a subject in an image needs to be observed, and the observation requires a machine learning configuration in addition to still image recognition. Although the machine learning configuration is adapted for recognition, it is a challenge to dramatically enhance a precision of recognition. Furthermore, recognition using a machine learning configuration requires much more processing compared to still image recognition, so it is not suitable for use in a mobile device, such as a smart phone or a tablet PC.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for extracting a peak image includes an image selector configured to select one of continuously photographed images; a base image determiner configured to determine at least one base image according to a predetermined criterion; a difference calculator configured to calculate a difference between the selected image and the at least one base image; and a peak image determiner configured to determine a peak image among the continuously photographed images based on the difference.

The base image determiner may be further configured to determine the at least one base image to be an image prior to or subsequent to the selected image, or an image registered by a user as a base image, or any one of the continuously photographed images, or an image considered based on a usage log of the user to demonstrate a most or least frequent facial expression of the user.

The difference calculator may be further configured to extract a feature value from each of the at least one base image and the selected image, and calculate the difference between the selected image and the at least one base image based on the feature values.

The base image determiner may be further configured to determine a plurality of base images; and the difference calculator may be further configured to calculate respective differences between the selected image and each of the plurality of base images and accumulate the differences, or extract respective feature values from the selected image and the plurality of base images, calculate an average feature value of the feature values of the plurality of base images, and calculate a difference between the selected image and the plurality of base images based on the feature value of the selected image and the average feature value of the plurality of base images.

The difference calculator may be further configured to calculate the difference between the selected image and the at least one base image by applying a weight value to a specific region of a subject in each of the selected image and the at least one base image, and calculating a difference between the selected image and the at least one base image to which the weight value has been applied.

The peak image determiner may be further configured to determine the peak image to be an image having a difference exceeding a predetermined threshold among the continuously photographed images, or an image having a greatest or smallest difference among the continuously photographed images.

The apparatus may further includes a continuously photographed image generator configured to generate the continuously photographed images by continuously photographing a subject.

The peak image may be one of the continuously photographed images in which a pose or a gesture of a subject changes by a greatest amount compared to other ones of the continuously photographed images, or one of the continuously photographed images in which the pose or the gesture of the subject begins to change.

In another general aspect, a method of extracting a peak image includes selecting one of continuously photographed images; determining at least one base image according to a predetermined criterion; calculating a difference between the selected image and the at least one base image; and determining a peak image among the continuously photographed images based on the difference.

The determining of the at least one base image may include determining the at least one base image to be an image prior to or subsequent to the selected image, or an image registered by a user as a base image, or any one of the continuously photographed images, or an image considered based on a usage log of the user to demonstrate a most or least frequent facial expression of the user.

The calculating of the difference may include extracting a feature value from each of the at least one base image and the selected image; and calculating the difference between the selected image and the at least one base image based on the feature values.

The determining of the at least one base image may include determining a plurality of base images; and the calculating of the difference may include calculating respective differences between the selected image and each of the plurality of base images and accumulating the differences, or extracting respective feature values from the selected image and the plurality of base images, calculating an average feature value of the feature values of the plurality of base images, and calculating a difference between the selected image and the plurality of base images based on the feature value of the selected image and the average feature value of the plurality of base images.

The calculating of the difference may include applying a weight value to a specific region of a subject in each of the selected image and the at least one base image; and calculating a difference between the selected image and the at least one base image to which the weight value has been applied.

The determining of the peak image may include determining a peak image to be an image having a difference exceeding a predetermined threshold among the continuously photographed images, or an image having a greatest or smallest difference among the continuously photographed images.

The generating of the continuously photographed image may include generating the continuously photographed images by continuously photographing a subject.

The peak image may be one of the continuously photographed images in which a pose or a gesture of a subject changes by a greatest amount compared to other ones of the continuously photographed images, or one of the continuously photographed images in which the pose or the gesture of the subject begins to change.

In another general aspect, a apparatus for determining an image having a predetermined characteristic includes a calculator configured to compare each image of a continuous sequence of images with a base image; and a determiner configured to determine an image having a predetermined characteristic among the continuous sequence of images based on a result of the comparing.

The calculator may be further configured to calculate a respective difference between each image of the continuous sequence of images and the base image based on the result of the comparing; and the determiner may be further configured to determine the image having the predetermined characteristic based on the differences.

The image having the predetermined characteristic may be an image among the continuous sequence of images having a greatest difference from the base image, or a smallest difference from the base image, or a first image among the sequence of images having a difference from the base image, or an image among the continuous sequence of images having a difference from the base image exceeding a predetermined threshold.

The continuous sequence of images may be a continuous sequence of images of a user; and the image having the predetermined characteristic may be an image among the continuous sequence of images of the user in which a pose or a gesture of the user changes by a greatest amount compared to other images among the continuous sequence of images of the user, or an image among the continuous sequence of images of the user in which the pose or the gesture of the user begins to change.

The continuous sequence of images may be a continuous sequence of images of a user; and the base image may be selected from an image among the continuous sequence of images that is prior to or subsequent to an image among the continuous sequence of images to be compared to the base image, or an image registered by a user as a base image, or any image among the continuous sequence of images, or an image considered based on a usage log of the user to demonstrate a most or least frequent facial expression of the user.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Furthermore, the terms used in this application are defined in consideration of functions of the various examples, and may be varied depending on a purpose of a user or a manager, or usual practice, or other reasons. Therefore, definitions of the terms are to be made based on the overall context.

In this application, the term "peak image" refers to an image in which a pose or a gesture of a subject changes most dramatically, that is, changes by a greatest amount compared to other images, or an image in which such a change begins.

Figure 1:
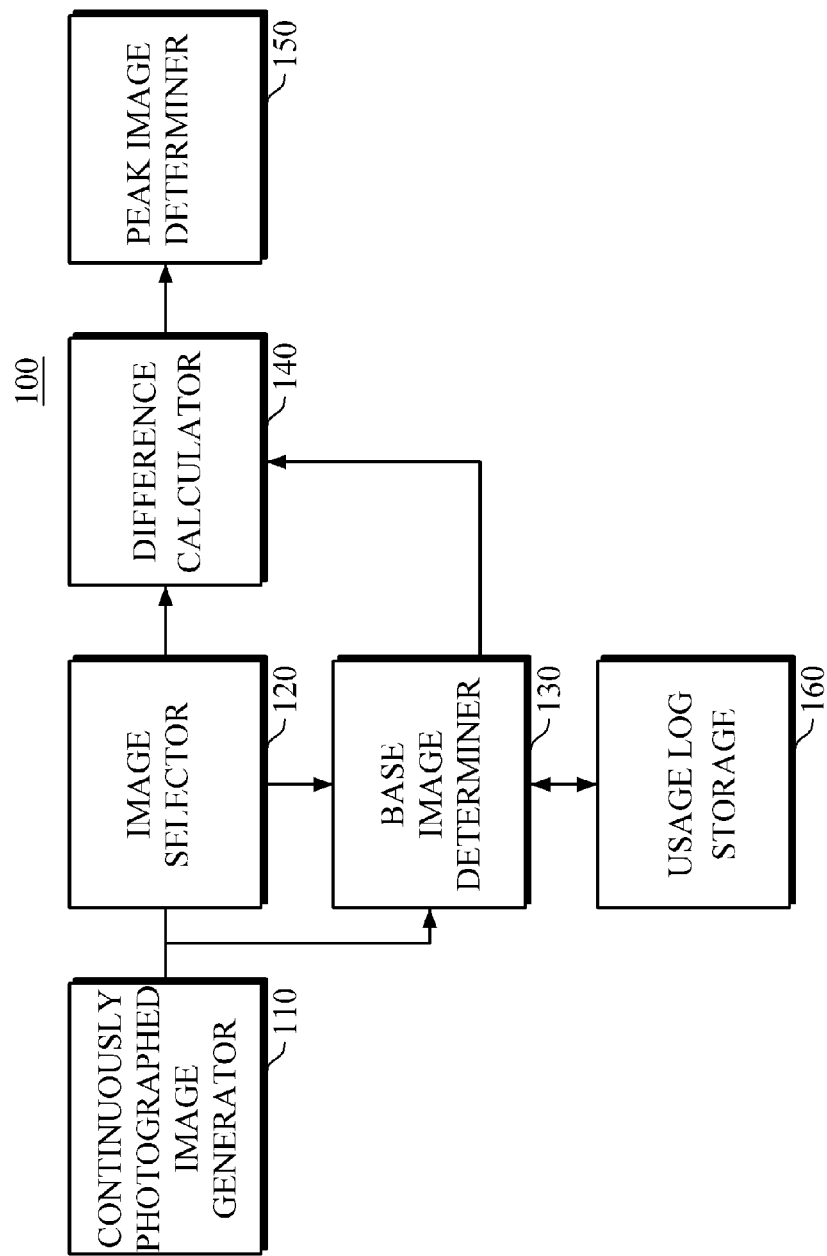
FIG. 1 is a configuration diagram illustrating an example of an apparatus for extracting a peak image.

FIG. 1 is a configuration diagram illustrating an example of an apparatus for extracting a peak image.

Elements in the following examples are divided by functions thereof for convenience of explanation, but this does not mean that each element is separate from each other element. Thus, two or more elements may be combined into one element that performs the same functions as the two or more elements, or one element may be divided into a plurality of elements that cooperate to perform the same function as the one element. Combination or division of elements is possible within the spirit and scope of the claims and their equivalents.

Referring to FIG. 1, an apparatus 100 for extracting a peak image includes a continuously photographed image generator 110, an image selector 120, a base image determiner 130, a difference calculator 140, and a peak image determiner 150.

The continuously photographed image generator 110 photographs a subject continuously to generate continuously photographed images. The continuously photographed image generator 110 may be a digital camera, a camcorder, a mobile phone, a portable multimedia player (PMP), a webcam, or any other device that can photograph a subject to generate a plurality of continuously photographed images.

The continuously photographed image generator 110 may be included in the apparatus 100, or may be an external device separate from the apparatus 100.

The image selector 120 selects one of the continuously photographed images. In one example, the image selector 120 selects images from the continuously photographed images sequentially according to the times the images were generated.

The base image determiner 130 determines a base image according to a predetermined criterion. In one example, the base image determiner 130 determines a base image to be an image prior to or subsequent to the image selected by the selector 120, or an image registered by a user as a base image, or any one of the continuously photographed images, or an image considered based on a usage log of a user to demonstrate the most or least frequent facial expression of the user. However, these are merely examples, and the base image determiner 130 may determine a base image according to various other criteria. For example, the base image determiner 130 may determine a plurality of continuously photographed images existing within a specific range to be base images. The continuously photographed image generator 110 supplies the continuously photographed images to the base image determiner 130 to enable the base image determiner 130 to determine the base image to be an image prior to or subsequent to the image selected by the selector 120, or any one of the continuously photographed images. The image selector 120 supplies information to the base image determiner 130 identifying the image selected by the image selector 120 to enable the base image determiner 130 to determine the base image to be an image prior to or subsequent to the image selected by the selector 120.

An image registered by a user as a base image may be an image of the user taken with a digital camera, a camcorder, a mobile phone, a portable multimedia player (PMP), a webcam, or any other device that can photograph a subject that the user has registered as a based image, or an image of the user that the user has selected from a photo library and registered as a base image.

In the event that the base image determiner 130 determines, as a base image, an image that is considered based on a usage log of a user to demonstrate the most or least frequent facial expression of a user, the apparatus 100 may further include a usage log storage 160 to store the usage log of the user that can be accessed by the base image determiner 130. The usage log of the user is a database that stores images of the user photographed by the continuously photographed image generator 110. The base image determiner 130 may examine the images in the usage log to determine which one of these images demonstrates the most or least frequent facial expression of the user, and determine that image as a base image.

In one example, the base image determiner 130 determines a single base image or a plurality of base images according to a use or a purpose or a function of the apparatus 100. In the case that the base image determiner 130 determines a plurality of base images, a different weight value may be assigned to each base image and applied to a difference between an image selected by the selector 120 and that base image, so that a peak image may be determined based on the difference to which the weight value is applied as described in the following.

The difference calculator 140 calculates a difference between an image selected by the selector 120 and a base image determined by the base image determiner 130.

The difference calculator 140 analyzes the image selected by the image selector 120 and each base image determined by the base image determiner 130 to extract a feature value from the selected image and each base image, and compares the feature value of each base image with the feature value of the selected image and calculates a difference therebetween to determine a similarity between each base image and the selected image to calculate a difference therebetween. The greater the difference, the less similar the images are, and the lesser the difference, the more similar the images are. The similarity may be determined using an edge histogram for each pixel in a defined region, using an Active Shape Model for facial landmarks, comparing color histograms of the two images, comparing color variations of the two images, using a Scale Invariant Feature Transform (SIFT) algorithm, using a Speeded Up Robust Features (SURF) algorithm, or any other method of determining a similarity between two images known to one of ordinary skill in the art.

In one example in which the base image determiner 130 determines a single base image, the difference calculator may apply a weight value to a specific region of a subject in both the base image and the image selected by the image selector 120 and calculate a difference between the two images to which the weight value has been applied. For example, the difference calculator 140 may apply different weight values to eyes, a nose, and a mouth of a subject in an image, and then calculate a difference between the base image and the selected image to which the different weight values have been applied.

In another example in which the base determiner 130 determines a plurality of base images, when calculating a difference between each of the plurality of base images and an image selected by the image selector 120, the difference calculator 140 may accumulate the calculated difference between each of the plurality of base images and the selected image, or may calculate an average feature value of the plurality of base images, and then compare the average feature value with a feature value of the selected image to calculate a difference therebetween. In this case, a different weight value may be applied to each base image, a difference may be calculated between the selected image and each of the plurality of base images to which the different weight values have been applied.

The peak image determiner 150 determines a peak image among continuously photographed images based on a difference calculated by the difference calculator 140. In one example, the peak image determiner 150 determines a peak image to be an image having a difference exceeding a predetermined threshold among the continuously photographed images generated by the continuously photographed image generator 110, or an image having a greatest or smallest difference among the continuously photographed images generated by the continuously photographed image generator 110.

Figure 2:
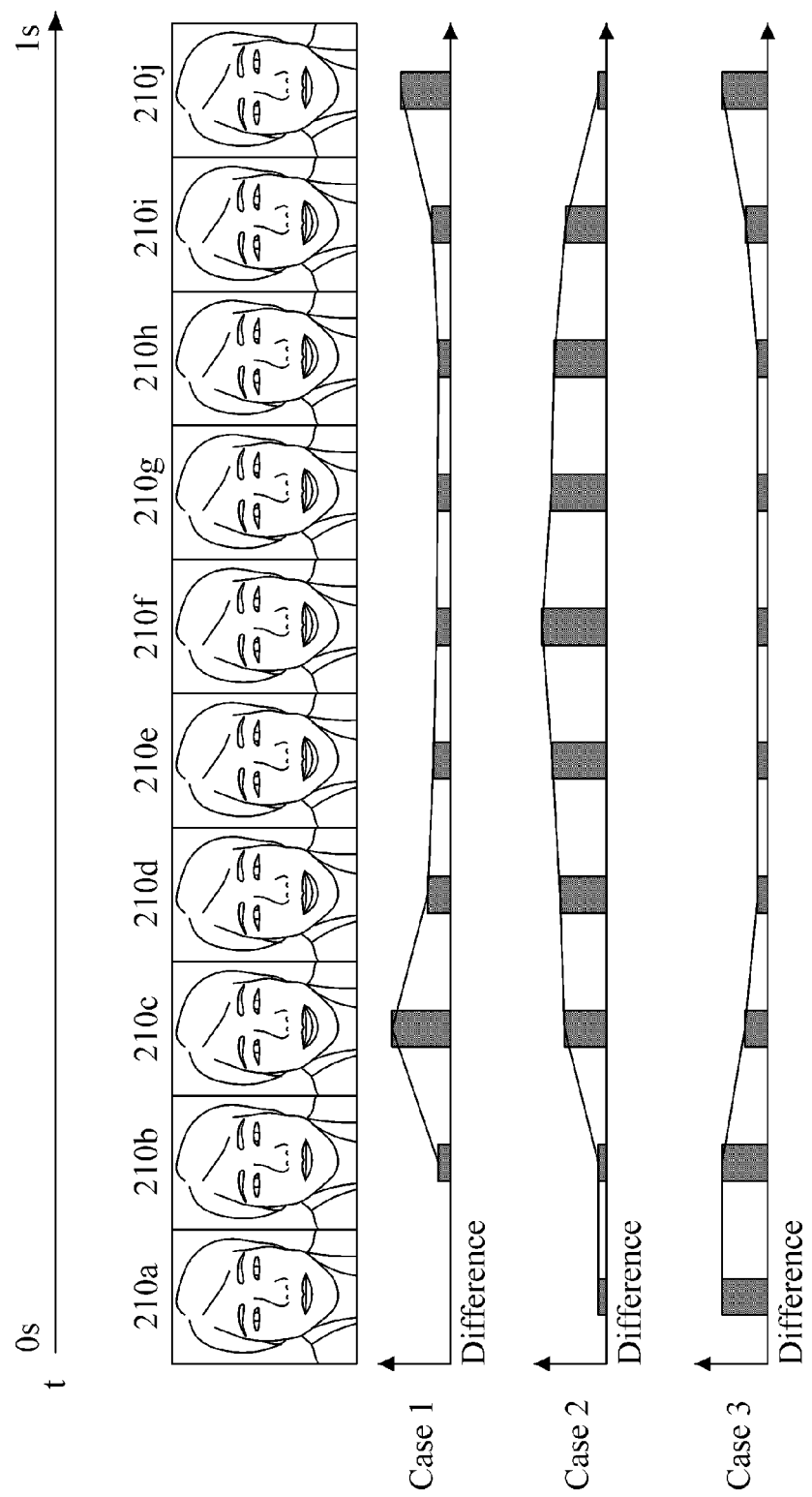
FIG. 2 is a diagram for explaining examples of a method of determining a peak image according to a base image.

FIG. 2 is a diagram for explaining examples of a method of determining a peak image according to a base image. In this case, it is assumed that the continuously photographed image generator 110 generates ten continuously photographed images 210a to 210j per second.

With reference to FIG. 2, Case 1 is a case in which a base image is an image prior to or subsequent to an image selected by the image selector 120; Case 2 is a case in which a base image is an image of a user with an expressionless face; and Case 3 is a case in which a base image is an image of a user with a smiling face. The base images in Case 2 and Case 3 determined by the base image determiner 130 may be an image prior to or subsequent to an image selected by the selector 120, an image registered by a user as a base image, any one of the continuously photographed images, or an image considered based on usage log information of a user to demonstrate the most or least frequent facial expression of the user.

In Case 1 in which a base image is an image prior to an image selected by the image selector 120, the difference calculator 140 compares images adjacent to each other and calculates a difference therebetween. Then, among the continuously photographed images 210a to 210j, the peak image determiner 150 determines, as a peak image, the image 210c for which a difference with respect to the base image exceeds a predetermined threshold.

In Case 2 in which a base image is an image of a user with an expressionless face, the difference calculator 140 compares the base image with each of the continuously photographed images 210a to 210j and calculates respective differences therebetween. Then, among the continuously photographed images 210a to 210j, the peak image determiner 150 determines, as a peak image, the image 210f for which a difference with respect to the base image is greatest among the continuously photographed images.

In Case 3 in which a base image is an image of a user with a smiling face, the difference calculator 140 compares the base image with each of the continuously photographed images 210a to 210j and calculates respective differences therebetween. Then, the peak image determiner 150 determines, as a peak image, the image 210f for which a difference with respect to the base image is smallest among the continuously photographed images.

In the above descriptions of Cases 1, 2, and 3, peak images were determined using different criteria. However, according to a usage or a purpose or a function of the apparatus 100, the same criterion may be applied in these cases, or two or more different criteria may be applied in each of these cases.

Hereinafter, examples of a system using the apparatus 100 are described. The apparatus 100 may be used in a facial expression recognition system and a face recognition system.

The facial expression recognition system is designed to recognize a facial expression of a user, infer an emotion of the user from the recognized facial expression, and provide various services based on the inferred emotion of the user. A changed facial muscle may convey a significant meaning compared to an unchanged facial muscle. Thus, if the apparatus 100 is used in the facial expression recognition system, the images 210c and 210j in which there are changes in a facial expression, or the image 210f in which a facial expression begins to change, may be extracted and provided as an input to the facial expression recognition system, thereby improving a precision of facial expression recognition and reducing an error rate of facial expression recognition.

The face recognition system is designed to recognize a face to identify a user and provide various services to the identified user. Since a changed facial muscle changes an appearance of a face compared to an unchanged facial muscle, if the apparatus 100 is used in a face recognition system, the apparatus 100 may recognize a sudden change in a facial expression that may cause an error in face recognition, extract the image in which the sudden change occurs as a peak image, and then provide the rest of the continuously photographed images excluding the peak image to the face recognition system, thereby improving a precision of face recognition.

In the above-described examples, the apparatus 100 is used in a facial expression recognition system or a face recognition system. However, these are merely examples, and instead the apparatus 100 may be used in any other recognition system, such as a gesture recognition system. In addition, the apparatus 100 may be used in a system that provides services by recognizing a facial expression that appears for only a short time to determine a preference of a user, or a system that provides services by calculating a time for which a facial expression lasts to determine a state of a user, such as concentration.

Figure 3:
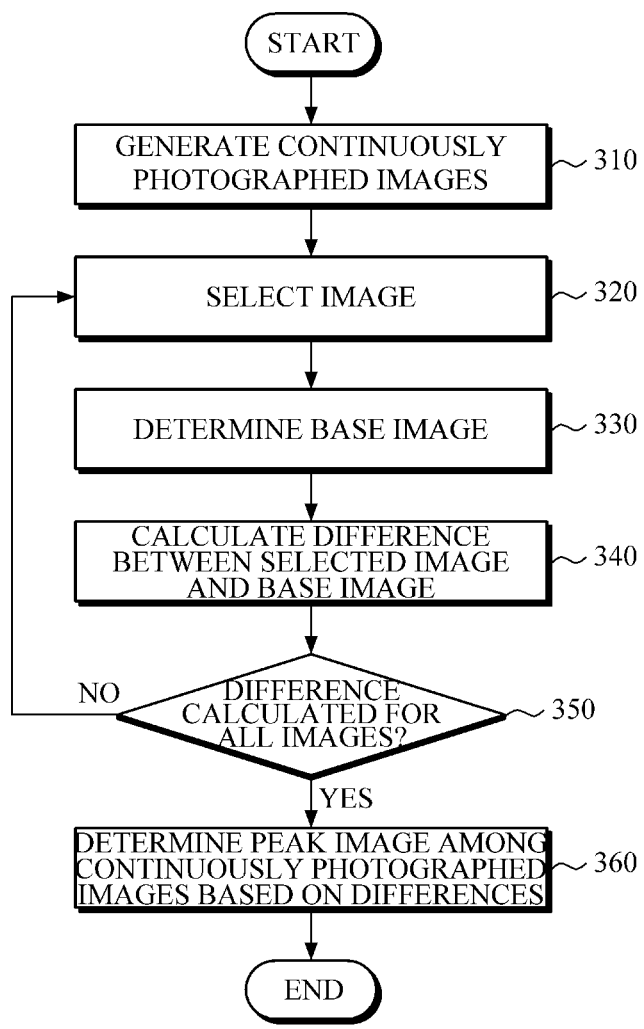
FIG. 3 is a flow chart illustrating an example of a method of extracting a peak image.

FIG. 3 is a flow chart illustrating an example of a method of extracting a peak image.

Referring to FIG. 3, the method of extracting a peak image starts out by photographing a subject continuously to generate continuously photographed images in operation 310. For example, the continuously photographed image generator 110 may photograph a subject continuously to generate continuously photographed images of the subject.

Then, one of the continuously photographed images is selected in operation 320. For example, the image selector 120 selects images from the continuously photographed images sequentially according to the times the images were generated.

Then, a base image is determined according to a predetermined criterion in operation 330. For example, the base image determiner 130 determines a base image to be an image prior to or subsequent to the image selected by the selector 120, or an image registered by a user as a base image, or any one of the continuously photographed images, or an image considered based on a usage log of a user stored in the usage log storage 160 to demonstrate the most or least frequent facial expression of the user. The base image determiner 130 may determine a single base image or a plurality of base images according to a use or a purpose or a function of the method.

Then, a difference between the image selected in operation 320 and the base image determined in operation 330 is calculated in operation 340. For example, the difference calculator 140 may calculate a difference between the selected image and the base image by analyzing both the selected image and the base image to extract respective feature values of the selected image and the base image, comparing the feature values with each other, and calculating a similarity between the two images based on the compared feature values. When calculating the difference between the two images, the difference calculator 140 may apply a weight value to a specific region of a subject in both of the images. In addition, when the base image determiner 130 determines a plurality of base images, the difference calculator 140 may accumulate a calculated difference between the selected image and each of the plurality of base images, or may calculate an average feature value of the plurality of base images, compare the average feature value with a feature value of the selected image to calculate a difference between the selected image and each of the plurality of base images. Furthermore, a different weight value may be assigned to each base image, and the different weight value may be applied to a difference between the selected image and each base image.

Then, it is determined in operation 350 whether a difference has been calculated for all of the continuously generated images. If the answer is "NO," the method returns to operation 320 to select another image from the continuously photographed images, and then repeats operations 330 and 340, although the same base image that was previously determined may be reused. If the answer is "YES," the method proceeds to operation 360.

Then, a peak image is determined based on the calculated differences in operation 360. For example, the peak image determiner 150 determines a peak image among the continuously photographed images based on the calculated differences. In one example, the peak image determiner 150 determines a peak image to be an image having a difference exceeding a predetermined threshold among the continuously photographed images, or an image having a greatest or smallest difference among the continuously photographed images.

By detecting a change in a facial expression or a gesture of a subject and extracting an image in which the biggest change occurs or a change begins, it is possible to select images regarded as being significant in facial expression recognition, gesture recognition, and face recognition, thereby improving a recognition performance.

In addition, by calculating a time for which a facial expression lasts, additional information, such as how much a user is concentrating, may be detected.

The continuously photographed image generator 110, the image selector 120, the base image determiner 130, the difference calculator 140, the peak image determiner 150, and the user log storage 160 illustrated in FIG. 1 that perform the operations described herein with respect to FIGS. 1-3 are implemented by hardware components. Examples of hardware components include image sensors, controllers, generators, drivers, memories, comparators, arithmetic logic units, adders, subtractors, multipliers, dividers, integrators, and any other electronic components known to one of ordinary skill in the art. In one example, the hardware components are implemented by computing hardware, for example, by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-3. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The method illustrated in FIG. 3 that performs the operations described herein with respect to FIGS. 1-3 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and detail may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for extracting a single peak image, the apparatus comprising:
   an image selector, implemented by a processor or computer, configured to select one image from a sequence of continuously photographed images;
   a base image determiner, implemented by a processor or computer, configured to determine at least one base image according to a predetermined criterion;
   a difference calculator, implemented by a processor or computer, configured to calculate a difference between each selected image and only the at least one base image; and
   a peak image determiner, implemented by a processor or computer, configured to determine a single peak image among all the continuously photographed images of the sequence based on the calculated differences for all the selected images.

2. The apparatus of claim 1, wherein the base image determiner is further configured to determine the at least one base image to be an image prior to or subsequent to the selected image, or an image registered by a user as a base image, or any one of the continuously photographed images, or an image considered based on a usage log of the user to demonstrate a most or least frequent facial expression of the user.

3. The apparatus of claim 1, wherein the difference calculator is further configured to extract a feature value from each of the at least one base image and the selected image, and calculate the difference between the selected image and the at least one base image based on the feature values.

4. The apparatus of claim 1, wherein the base image determiner is further configured to determine a plurality of base images; and
   the difference calculator is further configured to calculate respective differences between the selected image and each of the plurality of base images and accumulate the differences, or extract respective feature values from the selected image and the plurality of base images, calculate an average feature value of the feature values of the plurality of base images, and calculate a difference between the selected image and the plurality of base images based on the feature value of the selected image and the average feature value of the plurality of base images.

5. The apparatus of claim 1, wherein the difference calculator is further configured to calculate the difference between the selected image and the at least one base image by applying a weight value to a specific region of a subject in each of the selected image and the at least one base image, and calculating a difference between the selected image and the at least one base image to which the weight value has been applied.

6. The apparatus of claim 1, wherein the peak image determiner is further configured to determine the single peak image to be an image having a difference exceeding a predetermined threshold among the continuously photographed images, or an image having a greatest or smallest difference among the continuously photographed images.

7. The apparatus of claim 1, further comprising a continuously photographed image generator configured to generate the continuously photographed images by continuously photographing a subject.

8. The apparatus of claim 1, wherein the single peak image is one of the sequence of continuously photographed images in which a pose or a gesture of a subject begins to change.

9. A method of extracting a single peak image, the method comprising:
   selecting one image from a sequence of continuously photographed images;
   determining at least one base image according to a predetermined criterion;
   calculating a difference between the selected image and only the at least one base image;
   repeating the selecting, determining and calculating steps for each of the other continuously photographed images of the sequence; and
   determining a single peak image among all the continuously photographed images of the sequence based on the calculated differences for all the selected images.

10. The method of claim 9, wherein the determining of the at least one base image comprises determining the at least one base image to be an image prior to or subsequent to the selected image, or an image registered by a user as a base image, or any one of the continuously photographed images, or an image considered based on a usage log of the user to demonstrate a most or least frequent facial expression of the user.

11. The method of claim 9, wherein the calculating of the difference comprises:
    extracting a feature value from each of the at least one base image and the selected image; and
    calculating the difference between the selected image and the at least one base image based on the feature values.

12. The method of claim 9, wherein the determining of the at least one base image comprises determining a plurality of base images; and
    the calculating of the difference comprises calculating respective differences between the selected image and each of the plurality of base images and accumulating the differences, or extracting respective feature values from the selected image and the plurality of base images, calculating an average feature value of the feature values of the plurality of base images, and calculating a difference between the selected image and the plurality of base images based on the feature value of the selected image and the average feature value of the plurality of base images.

13. The method of claim 9, wherein the calculating of the difference comprises:
    applying a weight value to a specific region of a subject in each of the selected images and the at least one base image; and
    calculating a difference between the selected image and the at least one base image to which the weight value has been applied.

14. The method of claim 9, wherein the determining of the single peak image comprises determining the single peak image to be an image having a difference exceeding a predetermined threshold among the continuously photographed images, or an image having a greatest or smallest difference among the continuously photographed images.

15. The method of claim 9, further comprising an initial step of generating the continuously photographed images by continuously photographing a subject.

16. The method of claim 9, wherein the single peak image is one of the sequence of continuously photographed images in which a pose or a gesture of a subject begins to change.

17. An apparatus for determining a single peak image having a predetermined characteristic, the apparatus comprising:
- a calculator, implemented by a processor or computer, configured to compare each image of a continuous sequence of images with only a base image; and
- a determiner, implemented by a processor or computer, configured to determine a single peak image having the predetermined characteristic among the entire continuous sequence of images based on a result of the comparing of all the images of the continuous sequence.

18. The apparatus of claim 17, wherein the calculator is further configured to calculate a respective difference between each image of the continuous sequence of images and the base image based on the result of the comparing; and
- the determiner is further configured to determine the single peak image based on the differences.

19. The apparatus of claim 18, wherein the single peak image is an image among the continuous sequence of images having a greatest difference from the base image, or a smallest difference from the base image, or a first image among the sequence of images having a difference from the base image, or an image among the continuous sequence of images having a difference from the base image exceeding a predetermined threshold.

20. The apparatus of claim 17, wherein the continuous sequence of images is a continuous sequence of images of a user; and
- the single peak image is an image among the continuous sequence of images of the user in which a pose or a gesture of the user begins to change.

21. The apparatus of claim 17, wherein the continuous sequence of images is a continuous sequence of images of a user; and
- the base image is selected from an image among the continuous sequence of images that is prior to or subsequent to an image among the continuous sequence of images to be compared to the base image, or an image registered by a user as a base image, or any image among the continuous sequence of images, or an image considered based on a usage log of the user to demonstrate a most or least frequent facial expression of the user.

22. The apparatus of claim 17, wherein the single peak image is an image among the continuous sequence of images of a user in which a pose or a gesture of the user changes by a greatest amount compared to other images among the continuous sequence of images of the user.

23. The method of claim 9, wherein the single peak image is one of the sequence of continuously photographed images in which a pose or a gesture of a subject changes by a greatest amount compared to other ones of the sequence of continuously photographed images.

24. The apparatus of claim 1, wherein the single peak image is one of the sequence of continuously photographed images in which a pose or a gesture of a subject changes by a greatest amount compared to other ones of the sequence of continuously photographed images.

25. A non-transitory computer-readable medium storing instructions that, when executed by a processor, cause the processor to perform the method of claim 9.

* * * * *